United States Patent
Potter et al.

(10) Patent No.: US 7,526,519 B2
(45) Date of Patent: Apr. 28, 2009

(54) HIGH AVAILABILITY APPLICATION VIEW DEPLOYMENT

(75) Inventors: Tim Potter, Denver, CO (US); Mitch Upton, Highlands Ranch, CO (US); Christa Golding, Littleton, CO (US)

(73) Assignee: BEA Systems, Inc., Redwood Shores, CA (US)

( * ) Notice: Subject to any disclaimer, the term of this patent is extended or adjusted under 35 U.S.C. 154(b) by 525 days.

(21) Appl. No.: 10/293,655

(22) Filed: Nov. 13, 2002

(65) Prior Publication Data
US 2003/0220967 A1    Nov. 27, 2003

Related U.S. Application Data

(60) Provisional application No. 60/376,958, filed on May 1, 2002.

(51) Int. Cl.
*G06F 15/16* (2006.01)
(52) U.S. Cl. .................................................. 709/200
(58) Field of Classification Search ................ 709/201, 709/203, 219–220, 222–223, 227, 235–237, 709/2, 200
See application file for complete search history.

(56) References Cited

U.S. PATENT DOCUMENTS

| | | |
|---|---|---|
| 5,283,897 A | 2/1994 | Georgiadis et al. |
| 5,321,841 A | 6/1994 | East et al. |
| 5,469,562 A | 11/1995 | Saether |
| 5,544,318 A | 8/1996 | Schmitz et al. |
| 5,604,860 A | 2/1997 | McLaughlin et al. |
| 5,630,131 A | 5/1997 | Palevich et al. |
| 5,748,975 A | 5/1998 | Van De Vanter |
| 5,801,958 A | 9/1998 | Dangelo et al. |

(Continued)

FOREIGN PATENT DOCUMENTS

CA    2 248 634    3/2000

(Continued)

OTHER PUBLICATIONS

Blake, "Rule-Driven Coordination Agents: A Self-Configurable Agent Architecture for Distributed Control", IEEE, Mar. 2001, pp. 271-277.

(Continued)

*Primary Examiner*—John Follansbee
*Assistant Examiner*—Saket K Daftuar
(74) *Attorney, Agent, or Firm*—Fliesler Meyer LLP

(57) ABSTRACT

High availability is obtained for the deployment and undeployment of application views by placing a redundant JMX server on each server in a cluster of servers for an application integration system. Each redundant JMX server can manage deployment work for the cluster, and is capable of sending a JMX notification to every other server in the cluster relating to the deployment work, such as a deploy, undeploy, or processing notification. While an administration server can manage the other servers in the cluster, the redundant JMX servers are capable of managing deployment work for the cluster in the event of a failure of the administration server.

This description is not intended to be a complete description of, or limit the scope of, the invention. Other features, aspects, and objects of the invention can be obtained from a review of the specification, the figures, and the claims.

21 Claims, 2 Drawing Sheets

U.S. PATENT DOCUMENTS

| | | | |
|---|---|---|---|
| 5,828,847 A * | 10/1998 | Gehr et al. ............ 709/239 | |
| 5,835,769 A | 11/1998 | Jervis et al. | |
| 5,836,014 A | 11/1998 | Faiman, Jr. | |
| 5,862,327 A | 1/1999 | Kwang et al. | |
| 5,892,913 A | 4/1999 | Adiga et al. | |
| 5,933,838 A | 8/1999 | Lomet | |
| 5,944,794 A | 8/1999 | Okamoto et al. | |
| 5,950,010 A | 9/1999 | Hesse et al. | |
| 5,951,694 A * | 9/1999 | Choquier et al. ............ 714/15 | |
| 5,961,593 A | 10/1999 | Gabber et al. | |
| 5,966,535 A | 10/1999 | Benedikt et al. | |
| 6,012,083 A | 1/2000 | Savitzky et al. | |
| 6,012,094 A | 1/2000 | Leymann et al. | |
| 6,016,495 A | 1/2000 | McKeehan et al. | |
| 6,018,730 A | 1/2000 | Nichols et al. | |
| 6,021,443 A | 2/2000 | Bracho et al. | |
| 6,023,578 A | 2/2000 | Birsan et al. | |
| 6,023,722 A * | 2/2000 | Colyer ............ 709/201 | |
| 6,028,997 A | 2/2000 | Leymann et al. | |
| 6,029,000 A | 2/2000 | Woolsey et al. | |
| 6,044,217 A | 3/2000 | Brealey et al. | |
| 6,061,721 A * | 5/2000 | Ismael et al. ............ 709/223 | |
| 6,067,623 A | 5/2000 | Blakley, III et al. | |
| 6,070,184 A | 5/2000 | Blount et al. | |
| 6,078,943 A | 6/2000 | Yu | |
| 6,081,840 A * | 6/2000 | Zhao ............ 709/224 | |
| 6,085,030 A | 7/2000 | Whitehead et al. | |
| 6,119,143 A | 9/2000 | Dias et al. | |
| 6,119,149 A | 9/2000 | Notani | |
| 6,128,279 A | 10/2000 | O'Neil et al. | |
| 6,131,118 A | 10/2000 | Stupek, Jr. et al. | |
| 6,141,686 A | 10/2000 | Jackowski et al. | |
| 6,141,701 A | 10/2000 | Whitney | |
| 6,148,336 A | 11/2000 | Thomas et al. | |
| 6,154,738 A | 11/2000 | Call | |
| 6,154,769 A | 11/2000 | Cherkasova et al. | |
| 6,185,734 B1 | 2/2001 | Saboff et al. | |
| 6,189,044 B1 | 2/2001 | Thomson et al. | |
| 6,195,680 B1 * | 2/2001 | Goldszmidt et al. ............ 709/203 | |
| 6,212,546 B1 | 4/2001 | Starkovich et al. | |
| 6,222,533 B1 | 4/2001 | Notani et al. | |
| 6,226,666 B1 | 5/2001 | Chang et al. | |
| 6,226,675 B1 | 5/2001 | Meltzer et al. | |
| 6,226,788 B1 | 5/2001 | Schoening et al. | |
| 6,230,160 B1 | 5/2001 | Chan et al. | |
| 6,230,287 B1 | 5/2001 | Pinard et al. | |
| 6,230,309 B1 | 5/2001 | Turner et al. | |
| 6,233,607 B1 | 5/2001 | Taylor et al. | |
| 6,237,135 B1 | 5/2001 | Timbol | |
| 6,243,737 B1 | 6/2001 | Flanagan et al. | |
| 6,253,230 B1 * | 6/2001 | Couland et al. ............ 709/203 | |
| 6,269,373 B1 | 7/2001 | Apte et al. | |
| 6,282,711 B1 | 8/2001 | Halpern et al. | |
| 6,292,830 B1 | 9/2001 | Taylor et al. | |
| 6,292,932 B1 | 9/2001 | Baisley et al. | |
| 6,311,327 B1 | 10/2001 | O'Brien et al. | |
| 6,317,786 B1 * | 11/2001 | Yamane et al. ............ 709/224 | |
| 6,324,681 B1 | 11/2001 | Sebesta et al. | |
| 6,330,569 B1 | 12/2001 | Baisley et al. | |
| 6,334,114 B1 | 12/2001 | Jacobs et al. | |
| 6,336,122 B1 | 1/2002 | Lee et al. | |
| 6,338,064 B1 | 1/2002 | Ault et al. | |
| 6,343,265 B1 | 1/2002 | Glebov et al. | |
| 6,345,283 B1 | 2/2002 | Anderson | |
| 6,348,970 B1 | 2/2002 | Marx | |
| 6,349,408 B1 | 2/2002 | Smith | |
| 6,353,923 B1 | 3/2002 | Bogel et al. | |
| 6,356,906 B1 | 3/2002 | Lippert et al. | |
| 6,360,221 B1 | 3/2002 | Gough et al. | |
| 6,360,358 B1 | 3/2002 | Elsbree et al. | |
| 6,367,068 B1 | 4/2002 | Vaidyanathan et al. | |
| 6,374,297 B1 | 4/2002 | Wolf et al. | |
| 6,377,939 B1 | 4/2002 | Young | |
| 6,393,605 B1 | 5/2002 | Loomans | |
| 6,408,311 B1 | 6/2002 | Baisley et al. | |
| 6,411,698 B1 | 6/2002 | Bauer et al. | |
| 6,438,594 B1 | 8/2002 | Bowman-Armuah | |
| 6,442,565 B1 | 8/2002 | Tyra et al. | |
| 6,442,611 B1 | 8/2002 | Navarre et al. | |
| 6,445,711 B1 | 9/2002 | Scheel et al. | |
| 6,463,503 B1 | 10/2002 | Jones et al. | |
| 6,470,364 B1 | 10/2002 | Prinzing | |
| 6,515,967 B1 * | 2/2003 | Wei et al. ............ 370/244 | |
| 6,516,322 B1 | 2/2003 | Meredith | |
| 6,535,908 B1 | 3/2003 | Johnson et al. | |
| 6,549,949 B1 | 4/2003 | Bowman-Amuah | |
| 6,553,425 B1 | 4/2003 | Shah et al. | |
| 6,560,636 B2 | 5/2003 | Cohen et al. | |
| 6,560,769 B1 | 5/2003 | Moore et al. | |
| 6,584,454 B1 | 6/2003 | Hummel, Jr. et al. | |
| 6,594,693 B1 | 7/2003 | Borwankar | |
| 6,594,700 B1 | 7/2003 | Graham et al. | |
| 6,601,113 B1 | 7/2003 | Koistinen et al. | |
| 6,604,198 B1 | 8/2003 | Beckman et al. | |
| 6,609,115 B1 | 8/2003 | Mehring et al. | |
| 6,615,258 B1 | 9/2003 | Barry et al. | |
| 6,622,168 B1 | 9/2003 | Datta | |
| 6,636,491 B1 | 10/2003 | Kari et al. | |
| 6,637,020 B1 | 10/2003 | Hammond | |
| 6,643,652 B2 | 11/2003 | Helgeson et al. | |
| 6,654,932 B1 | 11/2003 | Bahrs et al. | |
| 6,662,357 B1 | 12/2003 | Bowman-Amuah | |
| 6,678,518 B2 | 1/2004 | Eerola | |
| 6,684,387 B1 * | 1/2004 | Acker et al. ............ 717/126 | |
| 6,684,388 B1 | 1/2004 | Gupta et al. | |
| 6,687,702 B2 | 2/2004 | Vaitheeswaran et al. | |
| 6,687,848 B1 | 2/2004 | Najmi | |
| 6,697,849 B1 * | 2/2004 | Carlson ............ 709/219 | |
| 6,721,740 B1 | 4/2004 | Skinner et al. | |
| 6,721,747 B2 | 4/2004 | Lipkin | |
| 6,721,779 B1 | 4/2004 | Maffeis | |
| 6,732,237 B1 | 5/2004 | Jacobs et al. | |
| 6,748,420 B1 | 6/2004 | Quatrano et al. | |
| 6,754,884 B1 | 6/2004 | Lucas et al. | |
| 6,782,416 B2 | 8/2004 | Cochran et al. | |
| 6,789,054 B1 | 9/2004 | Makhlouf | |
| 6,795,967 B1 | 9/2004 | Evans et al. | |
| 6,799,718 B2 | 10/2004 | Chan et al. | |
| 6,802,000 B1 | 10/2004 | Greene et al. | |
| 6,804,686 B1 | 10/2004 | Stone et al. | |
| 6,832,238 B1 | 12/2004 | Sharma et al. | |
| 6,836,883 B1 | 12/2004 | Abrams et al. | |
| 6,847,981 B2 | 1/2005 | Song et al. | |
| 6,850,979 B1 | 2/2005 | Saulpaugh et al. | |
| 6,857,012 B2 * | 2/2005 | Sim et al. ............ 709/222 | |
| 6,859,834 B1 * | 2/2005 | Arora et al. ............ 709/227 | |
| 6,874,143 B1 | 3/2005 | Murray et al. | |
| 6,889,244 B1 | 5/2005 | Gaither et al. | |
| 6,910,041 B2 | 6/2005 | Exton et al. | |
| 6,915,519 B2 | 7/2005 | Williamson et al. | |
| 6,918,084 B1 | 7/2005 | Slaughter et al. | |
| 6,922,827 B2 | 7/2005 | Vasilik et al. | |
| 6,925,482 B2 | 8/2005 | Gopal | |
| 6,925,492 B2 * | 8/2005 | Shirriff ............ 709/220 | |
| 6,950,825 B2 * | 9/2005 | Chang et al. ............ 707/100 | |
| 6,950,872 B2 | 9/2005 | Todd, II | |
| 6,963,914 B1 | 11/2005 | Breitbart et al. | |
| 6,970,939 B2 * | 11/2005 | Sim ............ 709/236 | |
| 6,971,096 B1 | 11/2005 | Ankireddipally et al. | |
| 6,976,086 B2 | 12/2005 | Sadeghi et al. | |
| 6,983,328 B2 | 1/2006 | Beged-Dov et al. | |
| 6,993,743 B2 | 1/2006 | Crupi et al. | |
| 7,000,219 B2 | 2/2006 | Barrett et al. | |
| 7,017,146 B2 | 3/2006 | Dellarocas | |

| | | |
|---|---|---|
| 7,051,072 B2 | 5/2006 | Stewart et al. |
| 7,051,316 B2 | 5/2006 | Charisius et al. |
| 7,054,858 B2 | 5/2006 | Sutherland |
| 7,058,637 B2 | 6/2006 | Britton et al. |
| 7,062,718 B2 | 6/2006 | Kodosky et al. |
| 7,069,507 B1 | 6/2006 | Alcazar et al. |
| 7,072,934 B2 | 7/2006 | Helgeson et al. |
| 7,073,167 B2 | 7/2006 | Iwashita |
| 7,080,092 B2 | 7/2006 | Upton |
| 7,089,568 B2 | 8/2006 | Yoshida et al. |
| 7,089,584 B1 | 8/2006 | Sharma |
| 7,107,578 B1 | 9/2006 | Alpern |
| 7,111,243 B1 | 9/2006 | Ballard et al. |
| 7,117,504 B2 | 10/2006 | Smith et al. |
| 7,127,704 B2 | 10/2006 | Van De Vanter et al. |
| 7,143,186 B2 | 11/2006 | Stewart et al. |
| 7,146,422 B1 | 12/2006 | Marlatt et al. |
| 7,150,015 B2 | 12/2006 | Pace |
| 7,155,705 B1 | 12/2006 | Hershberg et al. |
| 7,159,007 B2 | 1/2007 | Stawikowski |
| 7,165,041 B1 | 1/2007 | Guheen et al. |
| 7,181,731 B2 | 2/2007 | Pace et al. |
| 7,184,967 B1 | 2/2007 | Mital et al. |
| 7,240,331 B2 | 7/2007 | Vion-Dury et al. |
| 2002/0004848 A1 | 1/2002 | Sudarshan et al. |
| 2002/0010781 A1 | 1/2002 | Tuatini |
| 2002/0010803 A1 | 1/2002 | Oberstein et al. |
| 2002/0016759 A1 | 2/2002 | Marcready et al. |
| 2002/0026630 A1 | 2/2002 | Schmidt et al. |
| 2002/0049788 A1 | 4/2002 | Lipkin et al. |
| 2002/0078174 A1* | 6/2002 | Sim et al. .................... 709/219 |
| 2002/0078365 A1 | 6/2002 | Burnette et al. |
| 2002/0083075 A1 | 6/2002 | Brummel et al. |
| 2002/0083118 A1* | 6/2002 | Sim .......................... 709/105 |
| 2002/0083187 A1* | 6/2002 | Sim et al. .................... 709/235 |
| 2002/0111820 A1 | 8/2002 | Massey |
| 2002/0111922 A1 | 8/2002 | Young et al. |
| 2002/0112069 A1* | 8/2002 | Sim .......................... 709/236 |
| 2002/0116454 A1 | 8/2002 | Dyla et al. |
| 2002/0120685 A1 | 8/2002 | Srivastava et al. |
| 2002/0120786 A1 | 8/2002 | Sehayek et al. |
| 2002/0133491 A1* | 9/2002 | Sim et al. .................... 707/10 |
| 2002/0143960 A1 | 10/2002 | Goren et al. |
| 2002/0152106 A1 | 10/2002 | Stoxen et al. |
| 2002/0161826 A1 | 10/2002 | Arteaga et al. |
| 2002/0165936 A1 | 11/2002 | Alston et al. |
| 2002/0169644 A1 | 11/2002 | Greene |
| 2002/0184145 A1 | 12/2002 | Sijacic et al. |
| 2002/0184610 A1 | 12/2002 | Chong et al. |
| 2002/0188486 A1 | 12/2002 | Gil et al. |
| 2002/0194244 A1 | 12/2002 | Raventos |
| 2002/0194267 A1 | 12/2002 | Flesner et al. |
| 2002/0194495 A1 | 12/2002 | Gladstone et al. |
| 2002/0198800 A1 | 12/2002 | Shamrakov |
| 2003/0004746 A1 | 1/2003 | Kheirolomoom et al. |
| 2003/0005181 A1 | 1/2003 | Bau, III et al. |
| 2003/0014439 A1 | 1/2003 | Boughannam |
| 2003/0018665 A1 | 1/2003 | Dovin et al. |
| 2003/0018832 A1 | 1/2003 | Amirisetty et al. |
| 2003/0018963 A1 | 1/2003 | Ashworth et al. |
| 2003/0023957 A1 | 1/2003 | Bau et al. |
| 2003/0026254 A1* | 2/2003 | Sim .......................... 370/392 |
| 2003/0028579 A1 | 2/2003 | Kulkarni et al. |
| 2003/0031176 A1* | 2/2003 | Sim .......................... 370/392 |
| 2003/0033437 A1 | 2/2003 | Fischer et al. |
| 2003/0043191 A1 | 3/2003 | Tinsley et al. |
| 2003/0046266 A1 | 3/2003 | Mullins et al. |
| 2003/0046369 A1* | 3/2003 | Sim et al. .................... 709/220 |
| 2003/0046591 A1 | 3/2003 | Asghari-Kamrani et al. |
| 2003/0055868 A1 | 3/2003 | Fletcher et al. |
| 2003/0055878 A1 | 3/2003 | Fletcher et al. |
| 2003/0061405 A1 | 3/2003 | Fisher et al. |
| 2003/0074217 A1 | 4/2003 | Beisiegel et al. |
| 2003/0074467 A1 | 4/2003 | Oblak et al. |
| 2003/0079029 A1 | 4/2003 | Garimella et al. |
| 2003/0093402 A1 | 5/2003 | Upton |
| 2003/0093403 A1 | 5/2003 | Upton |
| 2003/0093470 A1 | 5/2003 | Upton |
| 2003/0093471 A1 | 5/2003 | Upton |
| 2003/0097345 A1 | 5/2003 | Upton |
| 2003/0097574 A1 | 5/2003 | Upton |
| 2003/0105884 A1 | 6/2003 | Upton |
| 2003/0110117 A1 | 6/2003 | Saidenberg et al. |
| 2003/0110315 A1 | 6/2003 | Upton |
| 2003/0110446 A1 | 6/2003 | Nemer |
| 2003/0126136 A1 | 7/2003 | Omoigui |
| 2003/0145047 A1 | 7/2003 | Upton |
| 2003/0149791 A1 | 8/2003 | Kane et al. |
| 2003/0167358 A1 | 9/2003 | Marvin et al. |
| 2003/0182452 A1 | 9/2003 | Upton |
| 2003/0196168 A1 | 10/2003 | Hu |
| 2003/0212834 A1 | 11/2003 | Potter |
| 2003/0220967 A1 | 11/2003 | Potter |
| 2003/0233631 A1 | 12/2003 | Curry |
| 2004/0015368 A1 | 1/2004 | Potter et al. |
| 2004/0019645 A1 | 1/2004 | Goodman et al. |
| 2004/0040011 A1 | 2/2004 | Bosworth et al. |
| 2004/0068568 A1 | 4/2004 | Griffin |
| 2004/0078373 A1 | 4/2004 | Ghoneimy et al. |
| 2004/0078440 A1 | 4/2004 | Potter |
| 2004/0133660 A1 | 7/2004 | Junghuber et al. |
| 2004/0148336 A1 | 7/2004 | Hubbard et al. |
| 2004/0204976 A1 | 10/2004 | Oyama et al. |
| 2004/0216086 A1 | 10/2004 | Bau |
| 2004/0225995 A1 | 11/2004 | Marvin et al. |
| 2004/0260715 A1 | 12/2004 | Mongeon et al. |
| 2005/0033663 A1 | 2/2005 | Narin et al. |
| 2005/0223392 A1 | 10/2005 | Cox et al. |
| 2006/0234678 A1 | 10/2006 | Juitt et al. |
| 2007/0038500 A1 | 2/2007 | Hammitt et al. |

FOREIGN PATENT DOCUMENTS

| | | |
|---|---|---|
| EP | 1 006 443 A2 | 6/2000 |
| EP | 1 061 445 A2 | 12/2000 |
| WO | 00/29924 | 5/2000 |
| WO | WO 01/90884 A2 | 11/2001 |

OTHER PUBLICATIONS

Dahalin et al., "Workflow Interoperability Using Extensible Markup Language (XML)", IEEE, Jul. 2002, pp. 513-516.

Duvos et al., An Infrastructure for the Dynamic Distribution of Web Application and Services, Department of Computer Science Boston University, Dec. 2000, pp. 1-22.

Hewlett-Packard, HP Application Server, Technical Guide Version 8-0, HP, Nov. 15, 2001, pp. I-x, 1-234.

Kunisetty, "Workflow Modeling and Simulation Using an Extensible Object-Oriented Knowledge Base Management System", CiteSeer, 1996, pp. 1-60.

Lauer, "Introducing Microsoft DotNet", Jul. 2, 2002, http://web.archive.org/web/20020702162429/http://www.freebvcode.com/ShowCode.asp?ID=2171.

Mariucci, Enterprise Application Server Development Environments, University of Stuttgart, Oct. 10, 2000, pp. 1-30.

Mohan et al., "ARIES: A Transaction Recovery Method Suporting Fine-Graniarity Locking and Partial Rollbacks Using Write-Ahead Logging", ACM Transaction on Database Systems, vol. 17, No. 1, Mar. 1992, pp. 94-162.

Paul, Laura Gibbone, "RosettaNet: Teaching business to work together", Oct. 1, 1999. http://www.developer.com/xml/article.php/616641.

Richter, J., "Advanced Windows Programming", 1996, Microsoft Press™, pp. 697-699.

Roman et al., The Technical Benefits of EJB and J2EE Technolgoies over COM+ and Windows DNA, Enterprise Edition (J2EE) Technologies, Dec. 1999, pp. 1-24.

Sun Microsystems, iPlanet Application Server 6.0 White Paper, iPlanet E-Commerce Solutions, May 25, 2000, pp. 1-104.

Van Der Aaslt et al., "Verification of XRL: An XML-Based Workflow Language", IEEE, Jul. 2001, pp. 427-432.

Sosnoski, Dennis, "XML and Java Technologies: Data Binding, Part 1: Code Generation Approaches—JAXB and More", IBM, pp. 1-11 (Jan. 2003).

Chen, Jeff, et al., "eCo Architecture for Electronic Commerce Interoperability", CommerceNet (Jun. 29, 1999).

Java™ Debug Interface—definition, retrieved from http://java.sun.com/j2se/1.4.2/docs/guide/jpda/jdi/overview-summary.html on Feb. 21, 2007, 3 pages.

Kilgore, Richard A., "Multi-Language, Open-Source Modeling Using the Microsoft.net Architecture," Proceedings of the 2002 Winter Simulation Conference, IEEE, pp. 629-633.

Embury, Suzanne M., et al., "Assisting the Comprehension of Legacy Transactions," Proceedings Eighth Working Conference on Reverse Engineering, Oct. 2-5, 2001, IEEE, pp. 345-354.

Mays, Eric, et al., "A Persistent Store for Large Shared Knowledge Bases," IEEE Transactions on Knowledge and Data Engineering, vol. 3, Issue 1, pp. 33-41 (Mar. 1991).

Tang, Chungqiang. et al., "Integrating Remote Invocation and Distributed Shared State," Proceedings of the 18th International Parallel and Distributed Processing Symposium (IPDPS'04), Apr. 26-30, 2004, IEEE, 10 pages.

Bogunovic, Nikola, "A Programming Model for Composing Data Flow Collaborative Applications," IEEE, 7 pages (Mar. 1999).

Smith, Milton et al., "Marching Towards a Software Reuse Future," ACM Ada Letters, vol. XIV, No. 6, pp. 62-72, (Nov./Dec. 1994).

Sung, S. Y., et al., "A Multimedia Authoring Tool for the Internet," IEEE, pp. 304-308, (1997).

U.S. Appl. No. 10/271,194, filed Oct. 15, 2002, Upton.

U.S. Appl. No. 10/293,059, filed Nov. 13, 2002, Potter, et al.

U.S. Appl. No. 10/293,656, filed Nov. 13, 2002, Potter, et al.

U.S. Appl. No. 10/293,674, filed Nov. 13, 2002, Potter, et al.

Hamilton, Graham (Editor), Sun Microsystems JavaBeans, Ver. 1.01, Jul. 24, 1997, pp. 1-114.

Allamaraju, et al., "Professional Java Server Programming J2EE 1.3 Edition," WROX, pp. 1009-1057 (Sep. 2001).

Alonso, G., et al., "Advanced Transaction Models in Workflow Contexts," Proceedings of the 12th International Conference on Data Engineering, retrieved from http://citeseer.ist.psu.edu/alonso96advanced.html, 14 pages (Feb. 1996).

Microsoft, "Microsoft.net Framework," Microsoft Corporation, pp. 54 pages (2000).

Plaindoux, Didier, "XML Transducers in Jave," The Eleventh International World Wide Web Conference, retrieved from http://www2002.org/CDROM/poster/132/index.html, 6 pages (May 2002).

Sun Microsystems, "J2EE Connector Architecture 1.0," retrieved from: http://www.javasun.com/j2ee/connector/download.html. 188 pages (Aug. 2001).

Supplementary European Search Report for EP 02 78 4131 dated Aug. 8, 2007, 3 pages.

Muller, Robert, "Event-Oriented Dynamic Adaptation of Workflows: Model, Architecture, and Implementation," Dissertation, University of Leipzig, Germany, 351 pages (2002).

Peltz, Chris, "Web Services Orchestration," Hewlett Packard Company, pp. 1-20 (Jan. 2003).

Van Der Aaslst, W.M.P., et al., "XML Based Schema Definition for Suport of the Inter-Organizational Workflow," University of Colorado and University of Eindhoven report, retrieved from http://citeseer.ist.psu.edu/vanderaalst00xml.html, 39 pages (2000).

Willink, Edward D., "Meta Compilation for C++," University of Surrey, 379 pages (Jan. 2000).

* cited by examiner

HIGH AVAILABILITY APPLICATION VIEW DEPLOYMENT

CLAIM OF PRIORITY

This application claims priority to U.S. Provisional Patent Application No. 60/376,958, filed May 1, 2002, entitled "HIGH AVAILABILITY APPLICATION VIEW DEPLOYMENT," which is hereby incorporated herein by reference.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

CROSS-REFERENCED CASES

The following applications are cross-referenced and incorporated herein by reference:

U.S. patent application Ser. No. 10/271,194 entitled "Application View Component for System Integration, " by Mitch Upton, filed Oct. 15, 2002, now U.S. Pat. No. 7,080,092 issued Jul. 18, 2006.

U.S. patent application Ser. No. 10/293,059 entitled "High Availability for Asynchronous Requests," by Tim Potter et al., filed Nov. 13, 2002.

U.S. patent application Ser. No. 10/293,656 entitled "High Availability for Event Forwarding," by Tim Potter et at., filed Nov. 13, 2002.

U.S. patent application Ser. No. 10/293,674 entitled "High Availability Event Topic," by Tim Potter et al., filed Nov. 13, 2002.

FIELD OF THE INVENTION

The present invention relates to the deployment and undeployment of components such as application view components.

BACKGROUND

In present application integration (AI) systems, there can be several single points of failure. These single points of failure can include deployment or management facilities, event forwarding, event topics, remote clients, event subscriptions, response listeners, and response queues. Each of these features is tied to a single server within a server cluster. If that single server crashes, the entire AI application can become irreparably damaged and must be rebooted via a server reboot. For example, an entity in a present AI system can be pinned to the administration ("admin") server for the cluster. If the admin server goes down, entity functions such as the deployment and undeployment of application views will be unavailable to the system while the admin server is unavailable.

BRIEF SUMMARY

Systems and methods in accordance with the present invention can overcome deficiencies in prior art systems by changing the way in which work is processed. High-availability management of application views can be obtained for application integration by utilizing redundancy in a cluster of servers. A redundant JMX server can exist on each server in the cluster of servers. Each redundant JMX server is capable of managing deployment work for the cluster, such as the deployment and undeployment of application views. Each redundant JMX server can also send a JMX notification to every other server in the cluster relating to the deployment work, such as a deploy, undeploy, or processing notification.

An administration server in the cluster can be used to manage the other servers in the cluster. The redundant JMX servers can be capable of managing the deployment work for the cluster in the event of a failure of the administration server. The redundant JMX servers can notify the administration server when the deployment work is completed, or the administration server can be configured to check the redundant JMX servers periodically for deployment work. JMX MBeans can be used to represent the state of deployed application view. These JMX MBeans can include deployment MBeans, runtime MBeans, and summary MBeans. The JMX MBeans can be generated for a user using a common management model framework, for example.

Other features, aspects, and objects of the invention can be obtained from a review of the specification, the figures, and the claims.

DETAILED DESCRIPTION

A system and method in accordance with one embodiment of the present invention overcomes deficiencies in prior art application integration systems by changing the way in which server functions are handled. In order to eliminate one single point of failure that exists in a clustering environment, each managed server can utilize a local Java Management Extension (JMX) server. Use of a redundant JMX server on each managed node or server in a cluster can provide for the high availability of services and functions handled by those servers. Major problems can be avoided, as the AI system is not relying on a single administration server. Each managed server can have the ability to manage deployment and undeployment work. When a managed server finishes any such work, the managed server can send a notification using the JMX framework to inform the other servers in the cluster that the work has been completed. Until such a notification is sent, managed servers can be ready to take over the work.

Figure 1:
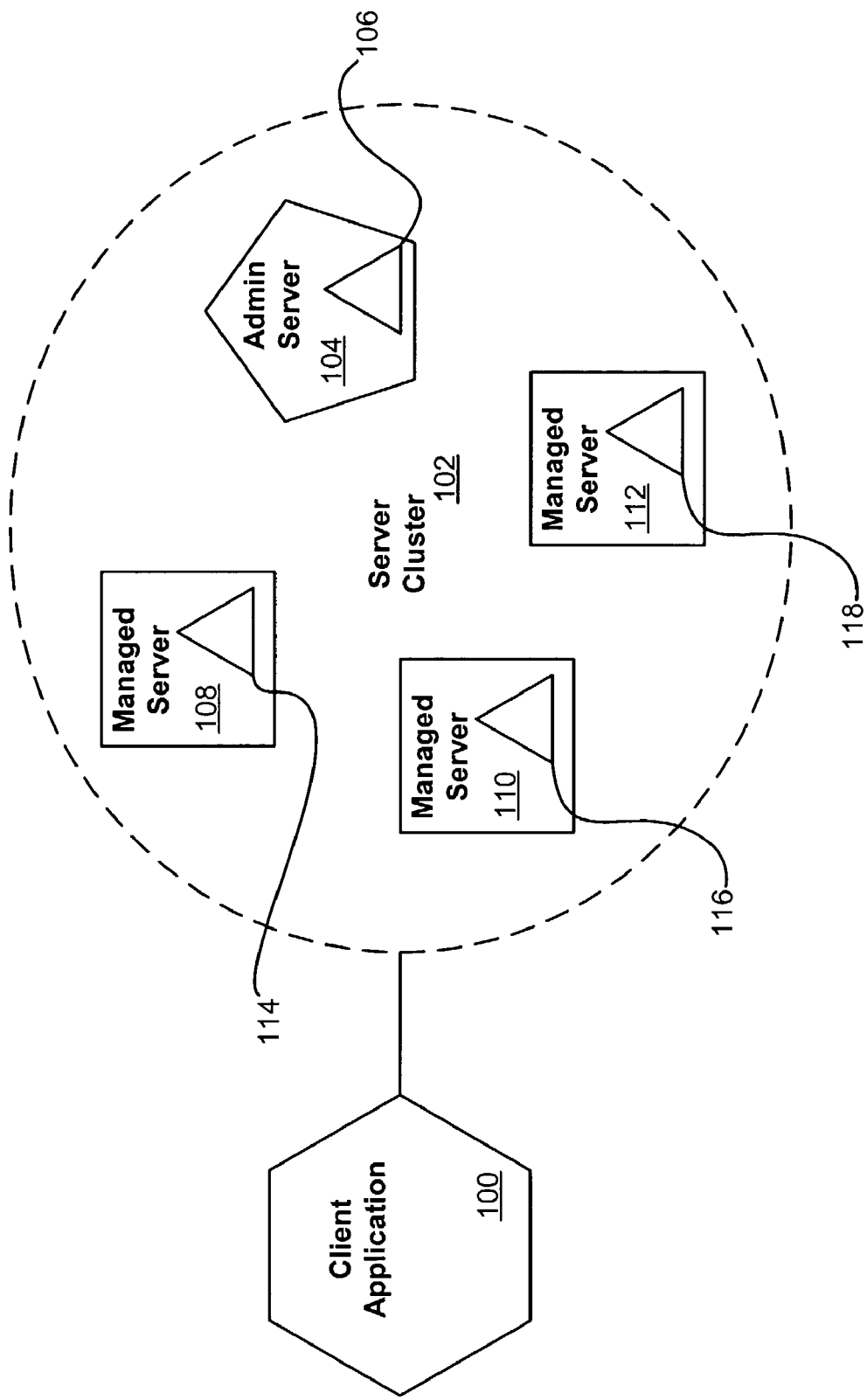
FIG. 1 is a diagram of a system in accordance with one embodiment of the present invention.

One of the advantages of using JMX is the ability to utilize JMX notification functionality. In some systems, the failure of an admin server prevents the processing of new deployments or undeployments. The failure will not, however, prevent the continued processing of existing tasks. This continued processing is possible in part because the JMX servers are redundant across the cluster. As shown in FIG. 1, there can be a JMX server 106, 114, 116, 118 on each managed server 108, 110, 112 in the server cluster 102, as well as on the admin server 104. A client application 100 or user can request the deployment of an application view, for example. That request can be handled by a server in the cluster 102, as directed by the admin server 104. If the JMX server 106 on the admin server 104 goes down, the cluster 102 still has the ability to process existing work using the redundant managed servers 108, 110, 112. If a new deployment is attempted, the deployment may be successful on the node that is contacted in the cluster. The other managed servers in the cluster, however, may not be aware of this new deployment or undeployment. If the admin server is down, a user can be advised to not attempt a new deployment or undeployment of application use.

This might not be a cause for concern in a production environment, as it may be rare to do a new application view deployment or undeployment. Entities such as application views are typically changed, updated, or removed in a maintenance window. It can be sufficient that work that has already been deployed and is running successfully will continue to be processed by other managed servers if a managed server goes down or becomes unavailable. A user may not be able to do any new deployment or undeployment, but the cluster will be as it stood before the admin server went down and can continue to work.

Figure 2:
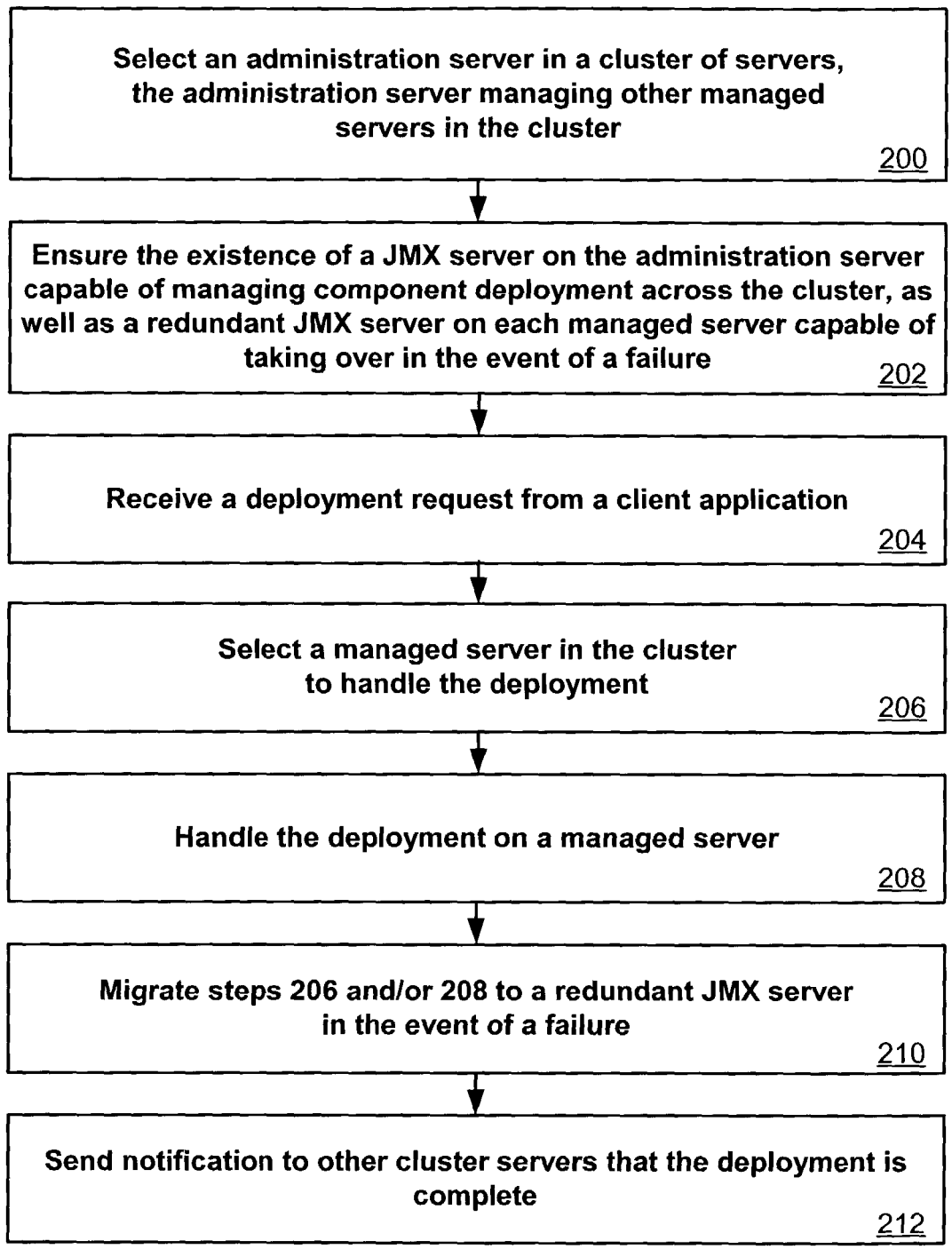
FIG. 2 is a flowchart showing a method that can be used with the system of FIG. 1.

A method using the system of FIG. 1 is shown in FIG. 2. In a cluster of servers for an AI application, an administration server is selected to manage other servers in the cluster 200. The existence of a JMX server on the administration server capable of managing deployment across the cluster is ensured, as well as the existence of at least one other redundant JMX server on a managed server in the cluster 202. Once the system is set up, a deployment request can be received from a user or client application, such as for the deployment of an application view component 204. The administration server can select a managed sever to handle the deployment 206. The selected managed server can then handle the deployment request 208. In the event of a failure of the administration server and/or the selected managed server, the execution and/or management of steps 206 and 208 can be migrated to a redundant JMX server on a managed server in the cluster 210. When the deployment is complete, a notification can be sent to the other servers in the cluster that the deployment is complete 212.

In other systems, each managed server can be configured to send a message, such as by multicast, to the other servers in the cluster when a deployment or undeployment occurs. This allows the other managed servers in the cluster to be aware of the deployment or undeployment, even though the admin server is unavailable. When the admin server becomes available again, it will be unaware that the deployment or undeployment occurred. This can be handled in a number of ways. For instance, a notification can be sent using the JMX framework. The admin server also can be configured to periodically check for new deployments or undeployments. The managed server accepting the deployment or undeployment can periodically attempt to contact the admin server until the admin server is notified, or can send a multicast "heartbeat" periodically to the cluster. Also, it is possible to use an event queue that will store the notification for the admin server until the admin server is available to receive the notification. Other notification methods can be used as appropriate.

High availability for application views is obtained with JMX, in one embodiment, by implementing special Management JavaBean components (MBeans) for the application views. A set of JMX MBeans can represent the state of an application view deployment within a server or server cluster. These MBeans can provide users of the AI component with the ability to see which application views have been deployed. The MBeans can also allow a user to modify properties of an application view deployment, such as pool sizes and log levels, as well as allowing the user to monitor the activity in the application view.

An application view MBean can provide a single integration point for deploy and undeploy operations, which can be managed by an application view deployer or server console.

The MBean can also provide persistence. Once an MBean is deployed, the MBean can be redeployed automatically when the server restarts. The MBean can support collection of both per-server and per-cluster statistics. The MBean can be used to monitor the number of active clients, the number of events delivered of a given type, the number of times a service of a given type has been invoked, and the number of event delivery and service invocation errors encountered. The MBean can also support console integration for monitoring deploy and undeploy operations.

Deployment and management of application views can be achieved by creating an instance of custom MBeans. In one embodiment, there are three types of custom MBeans used with an application view. One such bean type is a deployment MBean. A deployment MBean can represent the deployment of the application view, as well as the static information created for the application view at design-time. Instances of this MBean can be persistent, can have cluster scope, and can be targeted at all instances in a cluster to allow for managed server independence. Instances can boot without an admin server to feed them MBeans. In single-instance or non-cluster servers, there can be a single deployment MBean.

A runtime MBean can be used to represent the runtime state of the application view within an active server. Instances of this MBean may not be persistent, but can have server-specific or local scope and can be targeted at all instances in a cluster. In single-instance or non-cluster servers, there can be a single runtime MBean.

A summary MBean can be used to aggregate statistics from the runtime MBeans in the instance servers for a cluster. Instances of this MBean may not be persistent, but can have cluster scope and can be targeted at all instances in a cluster. In single-instance or non-cluster servers, there can be a single runtime MBean, but there will still be a summary MBean to provide consistent access to statistics in both cluster and non-cluster environments.

An application view deployment MBean can represent the atomic deployment of an application view. It can contain an attribute representing the application view descriptor. This descriptor attribute can be used to persistently deploy an application view at server start-up. This can remove the need for an integration startup deployer, used in current systems, as well as the interaction between the deployer and the admin deploy manager to retrieve persistently deployed application view names from an AI properties file. The deployment of these application views can also be facilitated.

High availability components can take advantage of a common management model (Commo) framework. In a Commo framework, a descriptor can be filled out and high-level metadata can be given about an object. This metadata can be run through an MBean generation tool, which can code-generate Java classes to be added into the specific implementation details. The high-level interface to the MBean is defined in the descriptor. The descriptor and metadata can be run through the code generation tool, which generates "skeleton" Java code. Once the skeleton Java code is generated, the user, client, or application can fill in the MBean-specific details to generate a "typical" Java class.

An application view can utilize metadata that includes information such as the service name and associated system function. The metadata can also store at least some of the data needed to successfully invoke the system function. As a result, the service can require less request data from the client invoking service, as the application view can augment the data passed by the client with the stored metadata. This can be a convenient way to hide the complexity of the underlying system function invocation from the client invoking a service.

An application view deployer can create a new application view deployment MBean instance when an application view is deployed. When the application view deployment MBean is created, a registration notification can be broadcast to all interested servers in a cluster. Interested servers can be indicated as part of a ".mdf" descriptor file for a Commo MBean. When the server receives the registration notification, it can retrieve the newly-registered application view descriptor and use the descriptor to update the appropriate application view deployment cache. At this point, the server can register for changes to the application view descriptor attribute. All subsequent attribute change notifications can allow any interested server to update its application view deployment cache. Each server in the cluster will not be dependent on JMS messages to keep its cache up-to-date.

An application view runtime MBean can handle maintenance of runtime statistics and an application view deployment cache on a local server. When a new instance of the application view runtime MBean is created, it can add an entry to the application view deployment cache for use by an application view EJB on a local server.

When an application view is deployed through use of an application view deployer, certain MBeans can be created, such as one application view deployment MBean per server instance. There can also be one application view runtime MBean created per server instance and one application view summary MBean per server instance. The application view deployment MBean can contain an application view descriptor. The application view runtime MBean can have methods to get and update statistics. The application view summary MBean can have the same interface as the application view runtime MBean, but only for a task such as getting statistics. The implementation of the getter methods can search the instances in the cluster for application view runtime MBeans and return aggregate statistics. When an application view is undeployed, all MBeans deployed in the deploy phase can be deleted.

In order to track event statistics, an application view runtime MBean can have an attribute such as "EventCount" that tracks the total number of events of a given type delivered through the current application view, such as the total number delivered to all clients. This counter can be updated any time the event context sends an event.

public int getEventCount(String eventType);
    public void incrementEventCount(String eventType);

The number of event delivery attempts that end in error can be tracked, such as with an "EventErrorCount" attribute. This attribute can be incremented any time an exception is thrown, such as from EventContext.postEvent( ).

public int getEventErrorCount(String eventType);
    public void incrementEventErrorCount(String eventType);

In order to track service statistics, an application view runtime MBean can have an attribute such as "ServiceCount" that tracks the total number of invocations made on a given service for the current application view, such as the total number from all clients. This counter can be updated any time one of the "invokeService" methods is called.

public int getServiceCount(String serviceName);
    public void incrementServiceCount(String serviceName);

The number of asynchronous invocations made on a given service can be tracked with an attribute such as "AsyncServiceCount". This attribute can be incremented when one of the "invokeServiceAsync" methods is called.

public int getAsyncServiceCount(String serviceName);
    public void incrementAsyncServiceCount(String serviceName);

The number of service invocations that end in error can be tracked with an attribute such as "ServiceErrorCount". This attribute can be incremented any time an exception is thrown from invokeService methods.

public int getServiceErrorCount( );
    public void setServiceErrorCount(int count);

Additional attributes that might be useful can track the minimum, maximum, and average service execution times, as well as event delivery rate.

In order to track client statistics, an application view runtime MBean can have an attribute such as "ClientCount" that can track the total number of aplication view clients that currently depend on this application view deployment. This counter can be updated any time a new application view object is constructed, and decremented anytime the finalizer or "close" is called.

public int getClientCount( );
    public void incrementClientCount( );
    public void decrementClientCount( );

In the overall AI system, an AI application can continue delivering events from adapters running in available nodes if a cluster server or managed server crashes. Event generators or routers running in the failed node can restart when the failed node restarts. Users can be notified that in-flight transactions have been cancelled or rolled-back, and should be retried. Wherever possible the transaction can be retried after reestablishing connections, in order to make use of resources on another live server. One example of AI reestablishing a connection is the event context as used for sending events to AI from an event router.

In the event of an admin server failure, an AI application can do the tasks listed with respect to the crash of a cluster server. The AI application should still be able to boot and reboot successfully using the previous domain and server configuration.

The use of server clustering allows an AI component, such as an event-forwarding server, event queue, or JMS server, to be used in a scalable and highly available fashion. A highly available component does not have any single points of failure, and can migrate services from failed nodes to live nodes in a cluster. Any service offered by an AI component can be targeted to several nodes in a cluster. In the event of a node failure in the cluster, the services located on the failed node can be migrated to another live node in the cluster.

In the event of a crash of a cluster or managed server, the AI application can continue accepting new work. The acceptance of new work can include the deploying and undeploying of application views and connection factories, monitoring of old application views and connection factories, delivering events from adapters, and servicing both synchronous and asynchronous service invocations. An AI application can also support the manual migration of services on the failed node to a live node, such as a singleton MDB listening on a physical destination managed by a failed JMS server. Application integration can use a singleton MDB, such as if a customer needs ordered event processing.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A system for high-availability management of application view components for application integration, comprising:
   a cluster of server nodes;
   a redundant Management server on each node in the cluster,
   wherein the redundant management server is a Java Management Extension (JMX) server,
   wherein the redundant management server manages deployment of application view components that integrate applications across the cluster such that the redundant management server on a first node in the cluster transmits a notification to the redundant management server on a second node in the cluster upon completing the deployment of an application view component and wherein a redundant management server on the second node takes over processing of said deployment of the application view component in case of failure of the redundant server on the first node;
   an administration server located on a node in the cluster having the redundant management server thereon wherein the administration server receives a component deployment request from a client, selects a node from the cluster and instructs the selected node in the cluster to deploy the application view component; and
   a set of managed beans deployed on each redundant management server for representing state of application deployments on the cluster, said managed beans including:
      a deployment bean that represents the deployment of the application view;
      a runtime bean that represents runtime state of the application view component within a node in the cluster; and
      a summary bean that aggregates statistics from the runtime beans deployed in all the nodes in the cluster; and
   an application view deployment cache located on one or more of the nodes in said cluster, wherein an entry is added to the application view deployment cache upon instantiating the runtime bean;
   wherein the redundant management server located on another node in the cluster takes over processing deployment requests in event of a failure of the administration server;
   wherein the redundant management server processing deployment requests in the event of administration server failure periodically attempts to contact the administration server until the administration server is notified of new deployments that have occurred since the administration server became unavailable;
   and wherein the administration server is notified of new application view deployments which have occurred during said failure by utilizing the managed beans in the event that the administration server becomes available again after said failure.

2. A system according to claim 1, wherein:
   each redundant management server further manages undeployment of application view components for the cluster.

3. A system according to claim 1, wherein:
   the redundant management server multicasts the notification to every other redundant management server in the cluster relating to the deployment.

4. A system according to claim 1, wherein:
   each redundant management server sends the notification selected from a group consisting of deploy notifications, undeploy notifications, and processing notifications.

5. A system according to claim 1, wherein: a redundant management server on at least one of the nodes in the cluster deploys the application view component for the cluster in event of a failure of the management server handling the deployment request.

6. A system according to claim 1, wherein:
   the administration server checks the redundant management server managing application deployment in the event of a failure of the administration server to determine whether the deployment is complete.

7. A system according to claim 1, further comprising:
   a descriptor containing metadata that is used by a code generation tool to create skeleton Java classes for the set of managed beans.

8. A system according to claim 1, wherein the set of managed beans is redeployed when the management server restarts.

9. A system according to claim 8, wherein:
   said application view component is an application view integration component that services synchronous and asynchronous service invocations from clients and delivers events from adapters to the clients.

10. A method for providing high-availability deployment of application view components, comprising:
    receiving a deployment request for an application view component from a client application to a cluster of servers, the cluster having one or more redundant Java Management Extension (JMX) servers distributed thereon, wherein the application view component integrates applications;
    selecting a managed server in the cluster of servers to handle the request, the selecting being done using a Java Management Extension (JMX) server on an administration server in the cluster;
    periodically checking each JMX server for deployment work using the administration server, wherein the administration server is configured to periodically check for new deployments and undeployments,
    handling the deployment request on the managed server selected by the administration server, the selected managed server containing a redundant JMX server that takes over processing deployment requests for the JMX server on the administration server during failure of the administration server wherein the redundant JMX server hosts beans for representing the state of component deployment, said beans further including: a deployment bean that represents the deployment of the application view component:
       a runtime bean that represents runtime state of the application view component within a node in the cluster; and
       a summary bean that aggregates statistics from the runtime beans deployed in all the nodes in the cluster;
    maintaining an application view deployment cache on one or more nodes in the cluster; adding an entry to the application view deployment cache upon instantiating the runtime bean:
    sending a notification to the other servers in the cluster of servers when the selected managed server has completed the deployment request such that each redundant JMX server in the cluster is informed of the completed deployment; and determining components that have been deployed during a failure of the administration server, said determining being performed by the administration server utilizing the beans after the administration server becomes available.

11. A method according to claim 10, further comprising: migrating the handling of the deployment to a second managed server in the cluster of servers, the second managed server containing a redundant JMX server.

12. A method according to claim 10, further comprising: deploying a redundant JMX server on each managed server in the cluster of server.

13. A method according to claim 10, wherein: sending the notification is accomplished by multicasting.

14. A method according to claim 10, wherein: sending the notification is accomplished by heartbeating the notification until it is received by each server in the cluster of servers.

15. A method according to claim 10, further comprising: storing the notification in an event queue until the notification can be retrieved by the administration server.

16. A method according to claim 10, further comprising: using a JMX MBean to allow a user to modify the deployment.

17. A method for providing high-availability deployment of application view components, comprising:
selecting an administration server in a cluster of servers, the administration server having a Java Management Extension (JMX) server that manages application view component deployment across the cluster, the application view component integrating one or more applications;
ensuring that a redundant JMX server exists on at least one managed server in the cluster of servers, wherein the redundant JMX server takes over managing application; view component deployment for the administration server's JMX server in the event of an administration server failure;
receiving an application view component deployment request from a client by the administration server;
selecting at least one server in the cluster by the administration server and instructing the selected server to handle the application, view component deployment request; transmitting a notification by the selected server to other servers in the cluster upon having completed the application view component deployment request;
deploying a set of beans to represent the state of the application view component deployment, said beans including: a deployment bean that represents the deployment of the application view component;
a runtime bean that represents runtime state of the application view component within a node in the cluster; and
a summary bean that aggregates statistics from the runtime beans deployed in all the nodes in the cluster;
maintaining an application view deployment cache on one or more nodes in the cluster; adding an entry to the application view deployment cache upon instantiating the runtime bean:
migrating management of the application view component deployment from the administration server to the redundant JMX server in the cluster in the event of an administration server failure; and
notifying the administration server of the application view component deployment that has occurred during the administration server failure, said notifying being performed after the administration server has become available after said failure.

18. A computer system comprising:
a processor;
object code executed by said processor, said object code configured to:
select an administration server in a cluster of servers, the administration server having a Java Management Extension (JMX) server that manages application view component deployment across the cluster, the application view component integrating one or more applications;
ensure that a redundant JMX server exists on at least one managed server in the cluster of servers, wherein the redundant JMX server takes over managing application view component deployment for the administration server's JMX server in the event of an administration server failure;
receive an application view component deployment request from a client by the administration server;
select at least one server in the cluster by the administration server and instructing the selected server to handle the application view component deployment request;
transmit a notification by the selected server to other servers in the cluster upon having completed the application view component deployment request;
deploy a set of beans to represent the state of the application view component deployment, said beans including a deployment bean that represents the deployment of the application view component;
a runtime bean that represents runtime state of the application view component within a node in the cluster; and
a summary bean that aggregates statistics from the runtime beans deployed in all the nodes in the cluster;
maintain an application view deployment cache on one or more nodes in the cluster;
add an entry to the application view deployment cache upon instantiating the runtime bean;
migrate management of the application view component deployment from the administration server to the redundant JMX server in the cluster in the event of an administration server failure; and
notify the administration server of the application view component deployment that has occurred during the administration server failure, said notifying being performed after the administration server has become available after said failure.

19. The system of claim 1, wherein the runtime bean further includes a service count attribute that tracks the total number of service invocations made on a given service for a current application view.

20. The system of claim 1, wherein the runtime bean further includes an event count attribute that tracks the total number of events of a given type delivered through a current application view.

21. The system of claim 1, wherein the runtime bean further includes a client count attribute that tracks the total number of application view clients that currently depend on the application view component.

* * * * *

UNITED STATES PATENT AND TRADEMARK OFFICE
CERTIFICATE OF CORRECTION

PATENT NO. : 7,526,519 B2  Page 1 of 1
APPLICATION NO. : 10/293655
DATED : April 28, 2009
INVENTOR(S) : Tim Potter et al.

It is certified that error appears in the above-identified patent and that said Letters Patent is hereby corrected as shown below:

On page 3, in column 2, under "Other Publications", lines 16-17, delete "Suporting Fine-Graniarity" and insert -- Supporting Fine-Granularity --, therefor.

On page 3, in column 2, under "Other Publications", line 25, delete "Technolgoies" and insert -- Technologies --, therefor.

On page 4, in column 2, under "Other Publications", line 13, delete "Jave,"" and insert -- Java," --, therefor.

On page 4, in column 2, under "Other Publications", line 28, delete "Suport" and insert -- Support --, therefor.

On page 4, in column 2, under "Other Publications", line 33, insert -- Hamilton, Graham (Editor), Sun Microsystems JavaBeans, Ver. 1.01, July 24, 1997, pp. 1-114 --.

In column 1, line 33, delete "at.," and insert -- al., --, therefor.

In column 9, line 43, in claim 17, delete "application," and insert -- application --, therefor.

Signed and Sealed this

Twenty-fifth Day of May, 2010

David J. Kappos
*Director of the United States Patent and Trademark Office*